United States Patent
Maas et al.

(10) Patent No.: US 7,156,995 B2
(45) Date of Patent: Jan. 2, 2007

(54) AERATION TANK CONTROL VALVE SYSTEM

(75) Inventors: Edward T. Maas, Waunakee, WI (US); Alan G. Mast, Sun Prarie, WI (US); Daniel A. Klein, Middleton, WI (US); Don D. Vaughan, Brookfield, WI (US); Jerry N. Miller, Windsor, WI (US)

(73) Assignee: Hellenbrand, Inc., Waunakee, WI (US)

( * ) Notice: Subject to any disclaimer, the term of this patent is extended or adjusted under 35 U.S.C. 154(b) by 546 days.

(21) Appl. No.: 10/091,170

(22) Filed: Mar. 4, 2002

(65) Prior Publication Data

US 2003/0164337 A1    Sep. 4, 2003

(51) Int. Cl.
- *B01D 24/12* (2006.01)
- *B01D 24/38* (2006.01)
- *B01D 61/10* (2006.01)
- *F04B 35/00* (2006.01)

(52) U.S. Cl. ............... 210/278; 210/283; 210/288; 210/721; 210/722; 210/771; 210/806; 210/807; 210/202; 210/209; 210/218; 210/259; 210/295; 210/136; 210/257.2; 210/416.1

(58) Field of Classification Search .......... 210/278, 210/283, 288, 721, 722, 771, 806, 807, 202, 210/209, 218, 259, 295, 136, 257.2, 416.1
See application file for complete search history.

(56) References Cited

U.S. PATENT DOCUMENTS

| 3,649,532 | A | * | 3/1972 | McLean ................... 210/718 |
| 4,534,867 | A | * | 8/1985 | Kreusch et al. ............. 210/722 |
| 5,096,596 | A | * | 3/1992 | Hellenbrand et al. ....... 210/721 |
| 5,945,004 | A | * | 8/1999 | Ohira et al. ................. 210/710 |
| 6,042,729 | A | * | 3/2000 | Chau ........................ 210/661 |
| 6,068,764 | A | * | 5/2000 | Chau ........................ 210/136 |
| 6,231,763 | B1 | * | 5/2001 | Chau ........................ 210/266 |
| 6,254,772 | B1 | * | 7/2001 | Chau ........................ 210/278 |
| 6,398,954 | B1 | * | 6/2002 | Chau ........................ 210/278 |
| 6,447,678 | B1 | * | 9/2002 | Chau ........................ 210/266 |
| 6,797,156 | B1 | * | 9/2004 | Chau ........................ 210/94 |

* cited by examiner

*Primary Examiner*—Minh-Chau T. Pham
(74) *Attorney, Agent, or Firm*—Lathrop & Clark LLP

(57) ABSTRACT

Mineral contaminants are removed from water in a system in which water is sprayed into an air head at the top of a tank through a diffuser and withdrawn through a pick-up tube. A solenoid valve operates to allows air from a compressor to flow into the top of the tank through a shuttle valve which is opened by the air pressure. Simultaneously a drain valve connected to the shuttle valve opens a drain, venting water and air from the tank. The shuttle valve, closed by the solenoid valve, closes the air supply line and connecting the shuttle valve to atmosphere, and pressure within the aeration tank can close the shuttle valve, which causes closing of the drain valve. The part of the valve which opens the drain is made responsive to excess pressure within the air tank to open the drain and so acts as a pressure relief valve.

95 Claims, 3 Drawing Sheets

AERATION TANK CONTROL VALVE SYSTEM

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to an apparatus and process for treating water in general, and to an apparatus and process for use in the removal of iron, manganese, sulfur, arsenic and other minerals from well or city main water in particular.

Well water commonly contains naturally occurring mineral contaminants. Iron, sulfur, and manganese frequently are found in well water giving undesirable odors and taste to the water. These mineral contaminants may also stain plumbing fixtures and corrode or clog pipes.

Mineral contaminants are commonly removed from water by entraining air in the raw water and passing the aerated water through a bed of calcium carbonate or dolomite to raise the pH level of the water and facilitate precipitation of the undesirable minerals. The increased pH water may then be passed through one or more filter media to remove the precipitated contaminants. Commonly oxygen is added to the raw water by passing the water through a pipe section of decreasing cross-sectional area with an air inlet known as a venturi nozzle.

Water treatment apparatuses employing venturi nozzles for aeration of raw water present certain difficulties in service and operation. Strainers will commonly have to be installed upstream of the venturi nozzle to remove sediment in the water which would obstruct the nozzle. Care must be taken to maintain the correct differential pressure between the pump and the pressure tank of the system to insure proper venturi operation. Furthermore, air introduced upstream of the pressure tank may cause pipes to plug ahead of the pressure tank. Furthermore, the strainer and venturi increase the pressures drop in the water system, which may have an effect on the amount of water needed for backwashing the system.

In addition to the maintenance and operation difficulties associated with venturi nozzles, the venturi may only operate when water is flowing through the system.

Although it is known to substitute an air pump for a venturi in a filtration system, such systems remain dependent on the flow of the water supply to bring fresh oxygen to the water.

U.S. Pat. No. 5,096,596 which is incorporated by reference herein, discloses a system and method for injecting air directly into the air head of an aeration tank, utilizing a controller having a clock means for automatic actuation of the source of compressed oxygen-rich gas at preselected times. Additional systems for utilizing and expanding upon the techniques disclosed in U.S. Pat. No. 5,096,596 are desirable.

SUMMARY OF THE INVENTION

The aeration tank control valve assembly of this invention is a compact assembly which may operate to control an aeration tank in a system for removing mineral contaminants from water. The aeration tank has a top opening which receives a valve assembly aeration head which provides an inlet at the top for admitting water to the aeration tank and an outlet for discharging water. A diffuser is supported within the tank by the aeration head through which water from the inlet is sprayed into an air head formed and maintained at the top of the aeration tank. A pick-up tube has an open end located within the aeration tank and is connected to the outlet of the aeration head to allow aerated water to be withdrawn from the aeration tank. A source of compressed oxygen-rich gas is placed in direct communication with the top of the aeration tank to form and maintain the air head and thus supply oxygen to the interior of the aeration tank. A shuttle valve positioned on the aeration head is caused to open by air pressure from an air compressor, which is applied to the shuttle valve by the operation of a solenoid valve. Operation of the solenoid valve allows air from the air compressor to flow into the top of the aeration tank through the shuttle valve and aeration head. Simultaneously with the opening of the shuttle valve, a drain valve, connected to the shuttle valve, opens a drain, so that water and air can vent from the aeration tank. The shuttle valve is closed by operation of the solenoid valve which closes the supply line from the air pump and connects the shuttle valve to the atmosphere so that the air pressure no longer holds the shuttle valve open, and pressure within the aeration tank can close the shuttle valve, the closing of which causes closing of the drain valve. The part of the valve which opens the drain is made responsive to excess pressure within the air tank to open the drain and so acts as a pressure relief valve.

It is an object of the present invention to provide a control valve system for an aeration tank of greater simplicity and compactness.

It is a further object of the present invention to provide a control valve system for an aeration tank where the amount and frequency of air charge to the tank may be simply adjusted.

It is an additional object of the present invention to provide a control valve system for an aeration tank which is readily accommodated to an aeration tank.

Further objects, features and advantages of the invention will be apparent from the following detailed description when taken in conjunction with the accompanying drawings.

DESCRIPTION OF THE PREFERRED EMBODIMENTS

Figure 1:
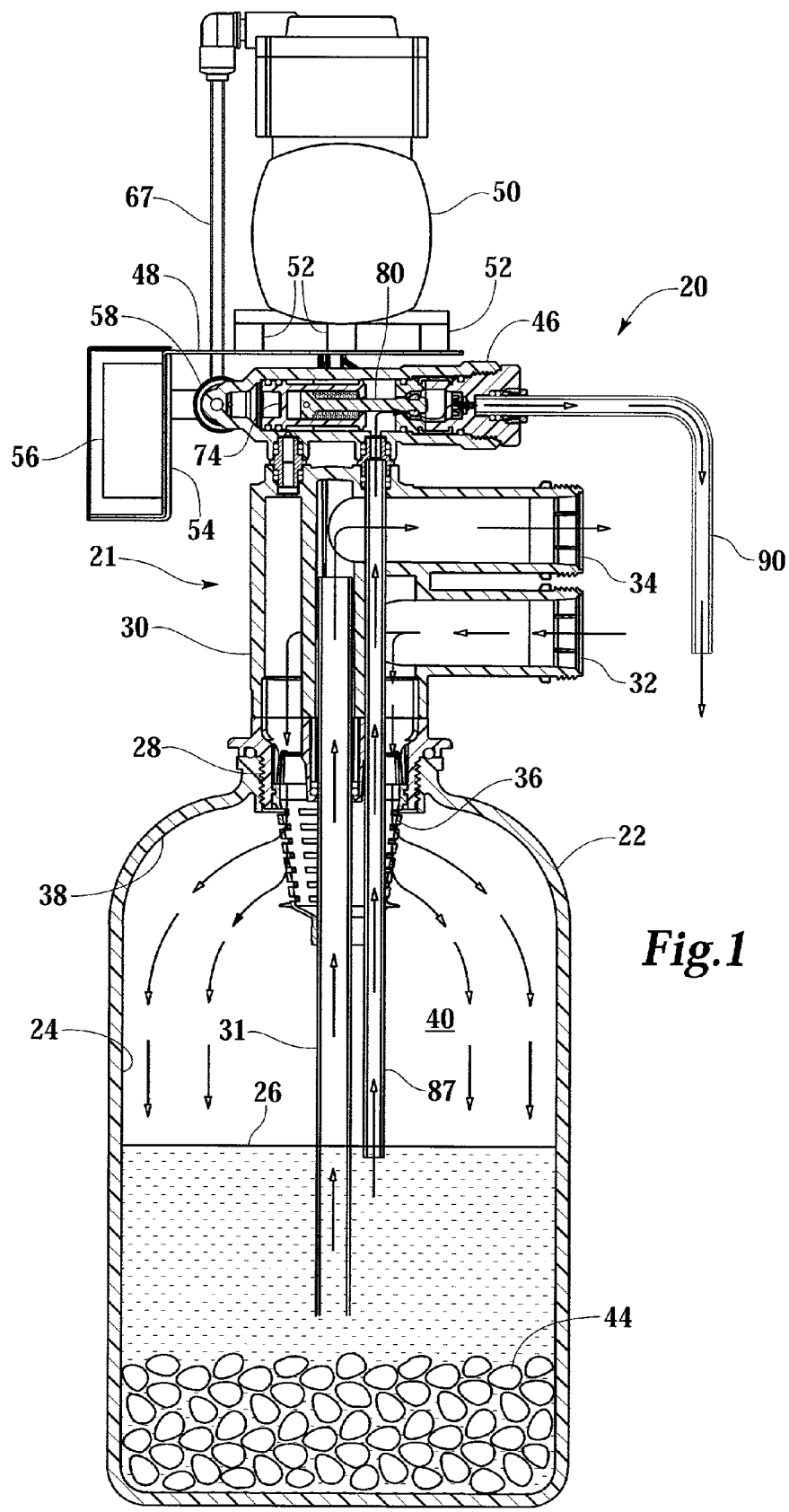
FIG. 1 is a somewhat schematic side elevational partial cross-sectional view of the aeration tank control valve assembly of this invention. For illustrative purposes, the tank is not shown to scale with the valve system.

Referring more particularly to FIGS. 1–4 wherein like numbers refer to similar parts, an water treatment aeration system 20 is shown in FIG. 1. The system 20 has an aeration tank 22, which has a pressure containing wall 24. The tank 22 is partially filled with water 26 and has a threaded top opening 28 into which is screwed the aeration head 30 of an aeration valve control assembly 21. The aeration head 30 can be constructed of glass filled Noryl® brand of modified Polyphenylene oxide and Polyphenylene ether. The aeration valve control assembly 21 conveniently assembles the elements of the aeration tank control system for mounting to the aeration tank by a single screw-on connection. The aeration valve control assembly is made up of a shuttle valve housing which is fixed to the aeration head 30, and which supports an air compressor 50 and a controller 56.

Figure 4:
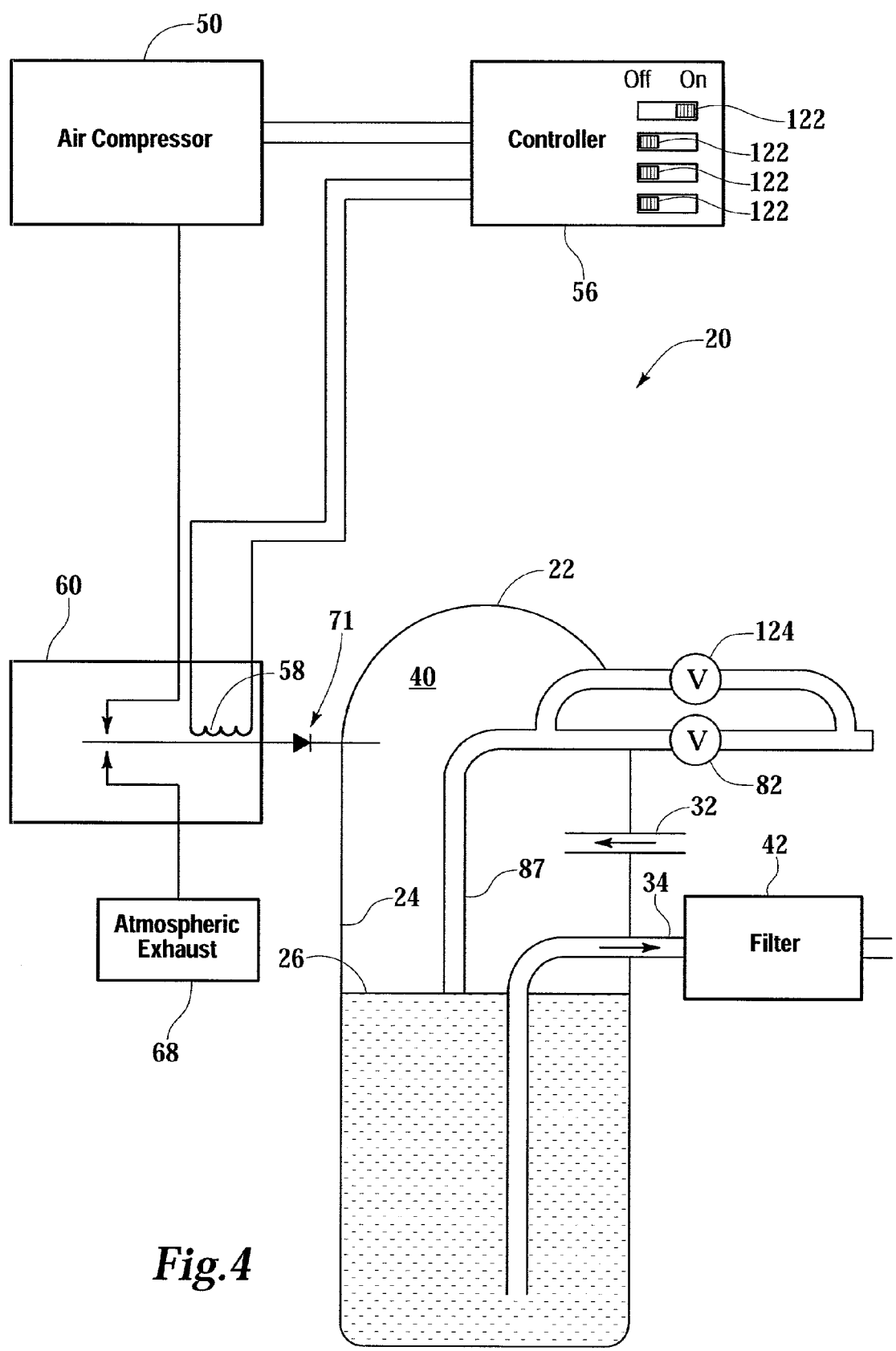
FIG. 4 is a schematic view of the system of FIG. 1.

The aeration head 30 has a water inlet 32, and a water outlet 34. The water inlet 32 and water outlet 34 are shown offset from each other vertically in FIG. 1 for illustrative purposes, but in a preferred embodiment are at the same vertical level. The water inlet 32 is connected to a diffuser 36 which causes water flowing from the inlet 32 to spray into an airhead 40 at the top 38 of the aeration tank 22. The airhead 40 extends at least about six inches below the top 38 of the aeration tank 22. As water is sprayed into the airhead 40, the water dissolves oxygen from the air contained in the airhead 40. By increasing the dissolved oxygen content of the water 26 in the aeration tank, various minerals, including iron, may be oxidized to produce a precipitate which can be removed. The precipitate may be removed from water removed through the outlet 34 in a filter tank or system 42 as shown in FIG. 4. A pick-up tube 31 extends into the water contained within the aeration tank, and extends upwardly through the diffuser 36 and communicates with the water outlet 34. A bleed-off tube 87 also extends from within the aeration tank through the diffuser and into the aeration head 30. The bottom of the aeration tank 22 may contain granules of calcium carbonate 44 to increase the pH of the water, which can aid in the precipitation of iron.

As shown in FIG. 1, a shuttle valve housing 46 is positioned on top of the aeration head 30. The shuttle valve housing 46 can be constructed of blended Polyethylene Terephthalate. The shuttle valve housing 46 is held in place by three screws (not shown) which pass through the three screw holes 47 shown in FIG. 2. The screws also pass through an air compressor support bracket 48, shown in FIG. 1, to thus connect the support bracket 48 and the valve housing 46 to the aeration head 30. An air compressor 50 is supported on resilient feet 52 on top of the support bracket 48, by screws (not shown) which connect the feet to the bracket 48. The support bracket 48 has a vertical flange 54 to which is mounted a controller 56. A solenoid 58 is mounted to this vertical flange 54 opposite the controller 56. The controller 56 periodically, every four to forty-eight hours, turns on the air compressor for a preset period, which may be from about five to fifteen minutes, preferably about 10 minutes, and energizes the solenoid 58 for the same period of time.

Figure 2:
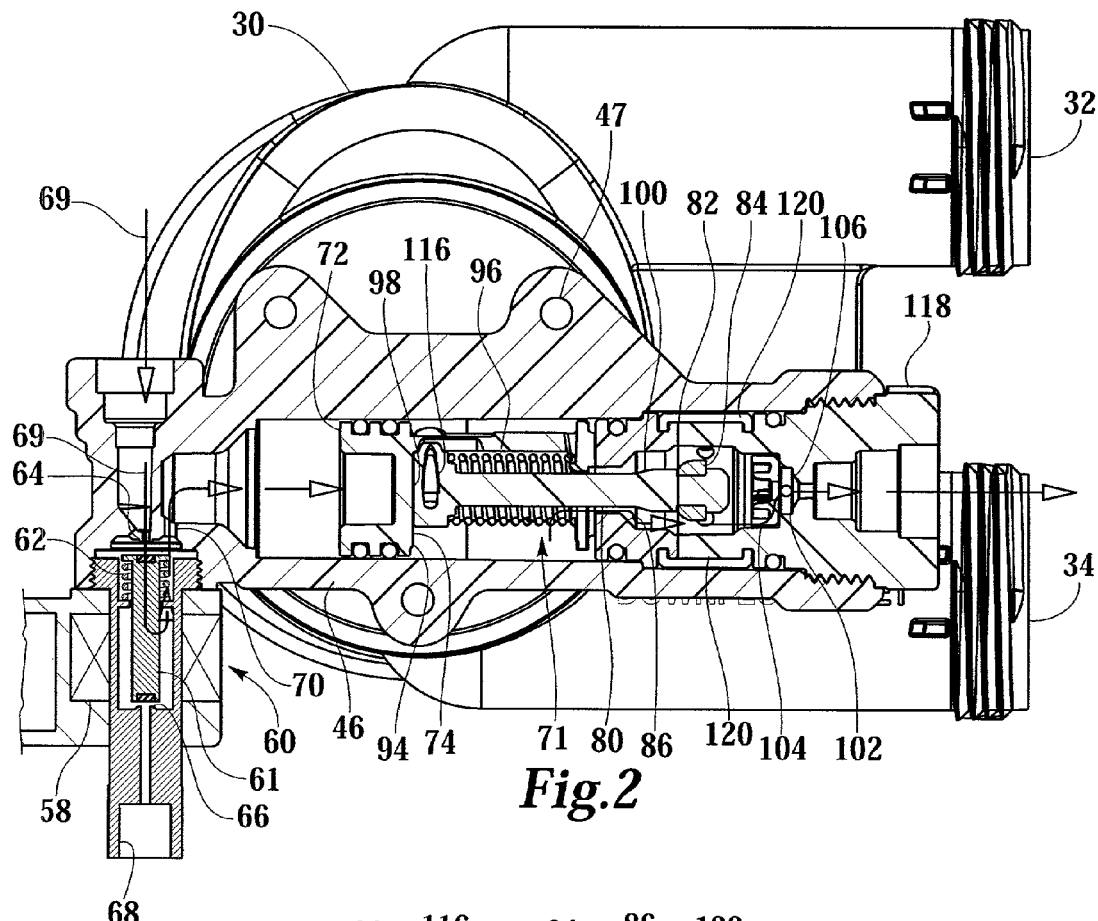
FIG. 2 is a top cross-sectional view of a solenoid, an air inlet, drain valve, and pressure relief valve, of the system of FIG. 1.

As shown in FIG. 2, a solenoid valve 60 is contained within the solenoid 58. The solenoid valve 60 has a valve stem 61 which moves between a first position where it engages a valve seat 64 and a second position, where the opposite end of the valve stem engages against a second valve seat 66 which leads to an atmospheric exhaust 68. The valve stem 61 is biased in the first position by a spring 62, and is moved to the second position when the solenoid is powered.

Figure 3:
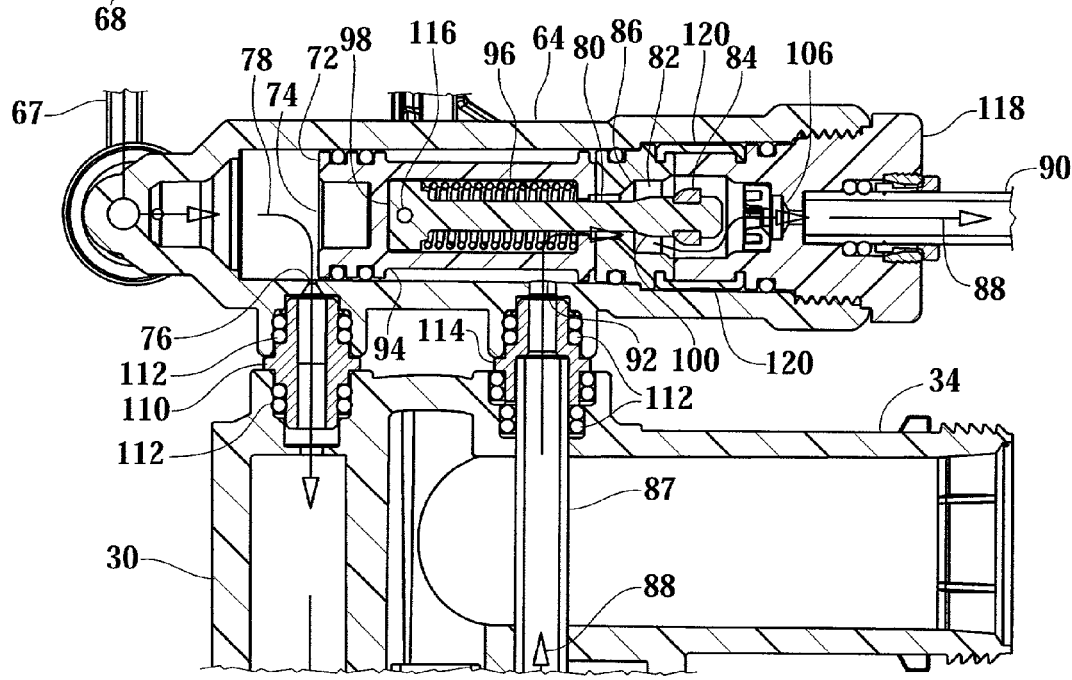
FIG. 3 is a side elevational cross-sectional view of the air inlet, drain valve, and pressure relief valve, of the system of FIG. 2.

When the controller 56 turns on the air compressor 50 and energizes the solenoid 58, compressed air or other oxidizing gas flows from the compressor 50 through a flexible conduit 67 into the solenoid valve 60. The air is prevented from flowing out of the atmospheric exhaust 68 by the valve stem 61 which is seated against the valve seat 66. A shuttle valve 71 is opened by air from the compressor 50. The air flows through the solenoid valve 60, as shown by arrows 69, through a passageway 70 into the shuttle valve housing 46 where the compressed air presses against a piston face 72 of the shuttle valve piston 74 causing the shuttle valve piston 74 to move to the right as shown in FIG. 3. The shuttle valve piston 74 moves to the right until a passageway 76 is opened so air, indicated by arrows 78, can flow into the air head 30. At the same time the valve piston 74 moves to the right to open the passageway 76, a poppet valve stem 80 located internally to the valve piston 74 is moved to the right, thereby opening a drain or poppet valve 82 by unseating an elastomeric seal 84 from the poppet valve seat 86. The poppet valve 82 allows air and water, from a bleed-off tube 87 as indicated by arrows 88 to flow to a drain 90. The bleed-off tube 87 connects to the shuttle valve housing 46 by a passageway 92. The bleed-off tube 87, as shown in FIG. 1, extends into the tank 22, and controls the position of the airhead 40 by draining water until the bleed-off tube 87 no longer extends into the water 26.

After ten minutes of air compressor operation, the controller 56 turns off the air compressor 50 and de-energizes the solenoid 58, allowing the spring 62 to return the valve stem 61 to press against the valve seat 64. The motion of the solenoid valve stem 61 opens a passageway for air to flow from the shuttle valve housing 46 through the solenoid valve 60 and through to the atmosphere exhaust 68. Pressure within the aeration tank 22 is applied to the backside 94 of the shuttle valve piston 74 through the bleed-off tube 87 and the passageway 92, causing the shuttle valve piston 74 to move to the left closing the passageway 76 and thus closing the shuttle valve 71. A spring 96 holds the poppet valve stem 80 in engagement with the shuffle valve piston 74 so the motion of the shuttle valve piston 74 closes the poppet valve 82 and thus the communication between the aeration tank 22 and the drain 90.

The poppet valve 82 is held in the closed position by the spring 96 which holds the base 98 of the poppet valve stem 80 engaged with and moving with the shuttle valve piston 74. However, if sufficient pressure exists within the aeration tank 22, the poppet valve 82 will open as the pressure acts against a conical surface 100, and rubber seat to 84 which are part of the poppet valve stem 80 as shown in FIG. 1. The poppet valve 82 thus acts as a pressure relief valve. The relief pressure is controlled by the effective radial area of the conical surface 100, which creates an opening force, and an opposing force generated by the spring 96. The poppet valve 82 connects to the drain 90 through an orifice in a resilient washer 102 held in place by a retainer 104 as shown in FIGS. 2 and 3. The orifice in the resilient washer 102 elongates and become smaller so it maintains a substantially constant flow as pressure increases and the resilient washer 102 is forced against a conical seat 106. Thus over a wide pressure range flow through the orifice defined by the resilient washer 102 is restricted to about 1.0 gallon per minute.

As shown in FIG. 3, the passageway 76 for air from the air compressor 50 through the shuttle valve housing 46 to the aeration head 30, is sealed to the aeration head 30 by an adapter 110 and two O-rings 112. In a similar manner, the passageway 92 through which the bleed-off tube 87 communicates with the shuttle valve housing 46 is connected with a second adapter 114 having O-rings 112. The adapters 110, 114 allow the simple assembly and replacement of the shuttle valve housing 46 to the aeration head 30.

The poppet valve stem 80 is retained on the shuttle valve piston 74 by a screw 116 which moves in a slot (not shown) formed in the shuttle valve piston 74. The structure forming the poppet valve seat 86 is connected to a shuttle valve end cap 118 by a pair of split collars 120, allowing the shuttle valve to be removed with the end cap 118. The shuttle valve end cap 118 forms the drain 90 and forms the conical surface 106 against which the resilient washer 102 is held by the retainer 104.

The operation of the aeration tank system 20 is illustrated schematically in FIG. 4. When power is applied to the controller 56, the controller turns on the air compressor 50, and energizes the solenoid 58 for a period of 10 minutes. At the end of 10 minutes the air compressor and the solenoid are turned off by operation of the controller 56. After a period of time selected from between four hours and forty-eight hours, the controller again turns on the air compressor and energizes the solenoid for 10 minutes. Hence the period of compressor operation may be less than about four percent of the time in which the air compressor is off. This cycle is repeated as long as power is supplied to the controller. The controller is programmable by means of four switches 122 which can be turned on or off. The four switches 122 define a four bit word having a value between zero and 15. In configuration illustrated in FIG. 4, the switches are set to a value of one, which results in a four-hour delay between periods of activation of the air compressor of the solenoid coil. If set to a total value of two, the controller produces an eight-hour delay, a set value of three results in a 12-hour delay and so on. The set value as of 12, 13, and 14 are all set to 48 hours. A set value of zero places the controller into a test mode where the air compressor and solenoid are turned on for 10 seconds followed by a four-minutes off followed by 10 seconds. To put the system into a switch testing mode, the controller is turned on with the switches set to a value of 15, thereafter the air compressor and solenoid turn on and off every second, and the moving of any switch to the "off" position will turn on the air compressor and the solenoid. The moving of any switch back to the "on" position turns the air compressor and the solenoid off.

The solenoid valve 60 connects the shuttle valve 71 either to the exhaust 68 or to the air compressor 50. When the shuttle valve 71 is connected to the air compressor 50, the shuttle valve piston 74 is displaced to allow air to flow into the airhead 40. When the shuttle valve 71 is connected to the atmospheric exhaust, the shuttle valve is displaced by pressure within the aeration tank to prevent air from leaving the airhead 40. Air within the shuttle valve flows to atmospheric exhaust to permit tank pressure to fully close communication between the air compressor and the aeration tank. When the air compressor is connected to the shuttle valve 71, movement of the shuttle valve piston 74 also displaces the poppet valve 82 from valve seat 86 to allow bleed off of water and air from the airhead 40 to the drain 90. In FIG. 4 a second valve 124 is shown for performing the function of a pressure relief valve. This function, by the design of the poppet valve stem 80, has been incorporated within the poppet valve so that it performs both functions of bleed off and over-pressure relief.

Referring to FIG. 1, it should be understood that the aeration tank 22 is shown at reduced scale, for convenience of illustration. The water inlet 32 is shown positioned beneath the water outlet 34 again for convenience of illustration and will typically be arranged side-by-side as shown in FIG. 2. The aeration tank 22 can operate with any filter system and can supply aerated water continuously even while the airhead is being recharged.

It should be understood that the aeration system 20 can be used with a water supply containing arsenic to facilitate or improve the amount of arsenic removed by an arsenic removal filter.

It should be understood that where the air compressor 50 is shown, other sources of compressed air or other oxygen rich gases could be used. It should be understood that the controller 56 acts as a timer, and other timers of a mechanical or electrical nature could be used. It should also be understood that the solenoid-actuated valve could be a mechanical valve operated by an electrically driven cam or other mechanisms.

It is understood that the invention is not limited to the particular construction and arrangement of parts herein illustrated and described, but embraces all such modified forms thereof as come within the scope of the following claims.

We claim:

1. An aeration control apparatus for a fluid filtration system for removing contaminants from a supply of fluid, comprising:
    an aeration tank, having an interior, a fluid inlet into the interior, a diffuser between the fluid inlet and the interior, a fluid outlet from the interior, and a bleed-off tube connecting the tank interior to a drain that allows the fluid and/or gas to bleed off to the drain;
    a source of compressed oxidizing gas;
    a first valve;
    a second valve downstream of the first valve, wherein the first valve has a first position connecting the source of compressed oxidizing gas through a first flow passage to the second valve, the second valve being displaced by gas pressure from the source of compressed oxidizing gas to a first position to open a second flow passage between the source of compressed oxidizing gas and the aeration tank and to connect the bleed-off tube to the drain, and the first valve has a second position closing the source of compressed oxidizing gas from the first flow passage and opening the first flow passage to an atmospheric exhaust; and
    a controllable actuator operatively connected to the first valve and having a first state for causing the first valve to assume the first position, and a second state for causing the first valve to assume the second position, wherein the controllable actuator is operable to repeatedly switch between the first state and the second state.

2. The aeration control apparatus of claim 1, further comprising a third valve operated by the second valve to connect the bleed-off tube to the drain.

3. The aeration control apparatus of claim 2, wherein the third valve, in addition to being operated by the second valve, is responsive to pressure within the interior of the aeration tank to open the bleed-off tube to the drain, independent of the operation of the second valve.

4. The aeration control apparatus of claim 1, wherein the first valve is an electrically-operated valve.

5. The aeration control apparatus of claim 4, wherein the first valve is a solenoid valve.

6. The aeration control apparatus of claim 1, wherein the source of compressed oxidizing gas is a compressor.

7. The aeration control apparatus of claim 6, wherein the controllable actuator is operatively connected to the compressor and causes, in the first state, compressed oxidizing gas to flow to the first valve and in the second state stops oxidizing gas from flowing to the first valve.

8. The aeration control apparatus of claim 1, wherein the controllable actuator is a timer, the first state is a first timing state and the second state is a second timing state.

9. The aeration control apparatus of claim 8, wherein the timer is programmable and wherein the first timing state is less than about four percent of the second timing state.

10. The aeration control apparatus of claim 8, wherein the first timing state is maintained for a period of between about five minutes and about fifteen minutes, and the second timing state is selectable and is maintained for a period of at least approximately four hours.

11. The aeration control apparatus of claim 10, wherein the first timing state extends over a period of about ten minutes, and the selectable second timing state is maintained for a period of between about four hours and about forty-eight hours.

12. The aeration control apparatus of claim 1, wherein the second valve comprises:
   a valve piston having a first side exposed to the source of compressed oxidizing gas when the first valve is in the first position, and a second side communicating with the interior of the air tank by way of the bleed-off tube; and
   a valve stem that moves with the valve piston, the valve stem having a valve seal positioned on and engagable with a valve seat, the valve stem moved by the valve piston to disengage the valve seal from the valve seat to open the interior of the aeration tank to the drain through the bleed-off tube.

13. The aeration control apparatus of claim 12, wherein the valve stem is separate from and engagable with the valve piston, the valve stem comprising:
   a first end engageable by the valve piston to move the valve stem with the valve piston; and
   a valve seal positioned on the valve stem opposite the first end of the valve stem and engagable with a valve seat;
   wherein the valve stem moves in response to the first end being engaged by the valve piston to disengage the valve seal from the valve seat to open the interior of the aeration tank to the drain through the bleed off tube.

14. The aeration control apparatus of claim 13, wherein the second valve further comprises a biasing member positioned between the valve piston and the valve stem to bias the valve stem into engagement with the valve piston.

15. The aeration control apparatus of claim 14, wherein the valve stem further comprises a pressure receiving surface to cause the valve stem to move against the biasing member forming a pressure relief valve, so that excess pressure within the aeration tank will cause the valve seal to move away from the valve seat to connect the bleed-off tube to the drain when the second valve is closed and pressure in the aeration tank is sufficiently high to overcome the biasing member and unseat the valve seat from the valve seal.

16. The aeration control apparatus of claim 1, wherein the fluid is water.

17. The aeration control apparatus of claim 1, wherein the supply of fluid is a well or a water main.

18. The aeration control apparatus of claim 1, wherein the source of compressed gas is a canister of compressed oxygen-rich gas.

19. A fluid filtration apparatus for removing oxidizable contaminants from a supply of fluid, comprising:
   an aeration tank, having an interior, a fluid inlet into the interior, a diffuser between the fluid inlet and the interior, a fluid outlet from the interior, and a bleed-off tube connecting the tank interior to a drain, the bleed-off tube allowing the fluid and/or a gas to bleed off to the drain;
   a source of compressed oxidizing gas;
   a controllable valve connecting the source of compressed oxidizing gas to a controlled valve, the controlled valve operable by pressure from the source of compressed oxidizing gas to open a flow passage between the source of compressed oxidizing gas and the aeration tank and to connect the interior of the aeration tank through the bleed-off tube to the drain;
   a controller operably connected to the controllable valve to operate the controllable valve between first and second positions;
   wherein the controlled valve has:
      a valve piston having a first side exposed to the source of compressed oxidizing gas when the controllable valve is in the first position, and a second side communicating with the interior of the air tank via the bleed-off tube; and
      a valve stem that moves with the valve piston, the valve stem having a valve seal positioned on and engagable with a valve seat, and the valve stem moved by the valve piston to disengage the valve seal from the valve seat to open the interior of the aeration tank to the drain through the bleed off tube.

20. The water filtration apparatus of claim 19, wherein the controller is programmed to place the controllable valve in the first position for a first period of time followed by placing the controllable valve in the second position for a second period of time that is at least about 24 times as long as the first period of time.

21. The water filtration apparatus of claim 20, wherein the first period of time is about ten minutes, and the second period of time is adjustable between about four hours and about forty-eight hours.

22. The fluid filtration apparatus of claim 19, wherein the valve stem is separate from and engagable with the valve piston, the valve stem comprising:
   a first end engageable by the valve piston to move the valve stem with the valve piston; and
   a valve seal positioned on the valve stem opposite the first end of the valve stem and engagable with a valve seat; and
   wherein the valve stem moves in response to the first end being engaged by the valve piston to disengage the valve seal from the valve seat to open the interior of the aeration tank to the drain through the bleed off tube.

23. The fluid filtration apparatus of claim 22, wherein the second valve further comprises a biasing member that biases the valve stem into engagement with the valve piston.

24. The fluid filtration apparatus of claim 23, wherein the valve stem further comprises a pressure receiving surface usable to move the valve stem against the biasing member, such that, when the second valve is closed, pressure within the aeration tank that is sufficiently high enough to overcome the biasing member acts on the pressure receiving surface to move the valve seal away from the valve seat to connect the bleed off tube to the drain.

25. The fluid filtration apparatus of claim 19, wherein the source of compressed gas is a compressor.

26. The fluid filtration apparatus of claim 19, wherein the source of compressed gas is a canister of compressed oxygen-rich gas.

27. The fluid filtration apparatus of claim 19, wherein the controllable valve is a solenoid valve.

28. An aeration tank control valve assembly for an aeration tank, the aeration tank comprising:
   a fluid inlet;
   a fluid outlet;
   a diffuser located within the aeration tank and communicating with the fluid inlet;
   a pick-up tube located within the aeration tank and communicating with the fluid outlet, the aeration control valve assembly comprising:

a valve housing, portions of the valve housing defining a flow passage that is connectable to an interior of the aeration tank;

a source of compressed oxidizing gas;

a bleed-off tube that extends into the aeration tank and that communicates with the valve housing;

a first valve connected to the valve housing;

a second valve located within the valve housing in communication with the first valve, the second valve having a first position to open communication between the flow passage and the aeration tank and to open communication between the bleed-off tube and a drain and a second position to close such communication, wherein the first valve has a first position connecting the source of compressed oxidizing gas to the flow passage, and a second position closing the source of compressed oxidizing gas from the flow passage and opening the flow passage to an atmospheric exhaust, the second valve being operated by gas pressure from the source of compressed oxidizing gas in the flow passage to open communication between the source of compressed oxidizing gas and the aeration tank;

a controllable actuator operatively connected to at least the first valve and having a first state for causing at least the first valve to assume its first position to provide oxidizing gas to the second valve, the second valve moving to its first position in response to the oxidizing gas being provided to the second valve, the controllable actuator having a second state for causing the first valve to assume its second position and allowing system pressure in the bleed-off tube to cause the second valve to move to its second position, to close communication between the bleed-off tube and the drain, wherein the controllable actuator is operable to repeatedly switch between the first state and the second state.

29. The aeration tank control valve assembly of claim 28, wherein the pick-up tube extends through the diffuser into the aeration tank.

30. The aeration tank control valve assembly of claim 28, wherein the bleed-off tube extends through the diffuser.

31. The aeration tank control valve assembly of claim 28, wherein the source of compressed oxidizing gas is mounted to the valve housing.

32. The aeration tank control valve assembly of claim 28, wherein the controllable actuator is mounted to the valve housing.

33. The aeration tank control valve assembly of claim 28, wherein the first valve is a solenoid valve.

34. The aeration tank control valve assembly of claim 28, wherein the source of compressed oxidizing gas is a compressor.

35. The aeration tank control valve assembly of claim 28, wherein the second valve comprises:

a valve piston having a first side exposed to the source of compressed oxidizing gas when the first valve is in its first position, and a second side communicating with the interior of the aeration tank via the bleed-off tube; and a valve stem that moves with the valve piston, the valve stem having a valve seal positioned on and engagable with a valve seat, and the valve stem moved by the first valve stem to disengage the valve seal from the valve seat to open the interior of the aeration tank to the drain through the bleed-off tube.

36. The aeration control apparatus of claim 35, wherein the valve stem is separate from and engagable with the valve piston, the valve stem comprising:

a first end engageable by the valve piston to move the valve stem with the valve piston;

a valve seal positioned on the valve stem opposite the first end of the valve stem and engagable with a valve seat;

a biasing member that biases the valve stem into engagement with the valve piston;

wherein the valve stem moves in response to the first end being engaged by the valve piston to disengage the valve seal from the valve seat to open the interior of the aeration tank to the drain through the bleed off tube.

37. The aeration control apparatus of claim 36, wherein the second valve further comprises:

a biasing member positioned between the valve piston and the valve stem to bias the valve stem into engagement with the valve piston.

38. The aeration control apparatus of claim 37, wherein the valve stern further comprises a pressure receiving surface to cause the valve stem to move against the biasing member forming a pressure relief valve, so that excess pressure within the aeration tank will cause the valve seal to move away from the valve seat to connect the bleed-off tube to the drain when the second valve is closed and pressure in the aeration tank is sufficiently high to overcome the biasing member and unseat the valve seat from the valve seal.

39. The aeration tank control valve assembly of claim 28, wherein the controllable actuator is a timer, the first state is a first timing state and the second state is a second timing state.

40. The aeration tank control valve assembly of claim 39, wherein the timer is programmable and wherein the first timing state is less than about four percent of the second timing state.

41. The aeration tank control valve assembly of claim 39, wherein the first timing state is maintained for a period of between about five minutes and about fifteen minutes, and the second timing state is selectable and is maintained for a period of at least approximately four hours.

42. The aeration tank control valve assembly of claim 41, wherein the first timing state extends over a period of about ten minutes, and the second timing state is selectable and is maintained for a period of between about four hours and about forty-eight hours.

43. An aeration control apparatus, connectable between an aeration tank, a source of compressed oxidizing gas and a drain of a fluid filtration system; the aeration control apparatus comprising:

a first valve;

a second valve downstream from the first valve; and a controllable actuator operatively connected to at least the first valve, wherein:

the first valve is displaceable between a first position where the second valve is disconnected from the source of compressed oxidizing gas and is connected to an ambient atmosphere and a second position where the second valve is connected to the source of compressed oxidizing gas;

the second valve is displaceable from a third position where a flow passage between the first valve and the aeration tank is closed to a fourth position where the flow passage between the first valve and the aeration tank is open;

the controllable actuator, when in a first state, operates the first valve to displace the first valve from the first position into the second position, and, when in a second state, does not operate the first valve, such that the first valve is in, or returns from the second position to, the first position, wherein the controllable actuator is operable to repeatedly switch between the first state and the second state; and upon the first valve being displaced into the second position to connect the source of compressed oxidizing gas to the second valve, a pressure of the compressed oxidizing gas supplied by the source of compressed oxidizing gas displaces the second valve from the third position to the fourth position to allow the compressed oxidizing gas to enter the aeration tank.

44. The aeration control apparatus of claim 43, further comprising:

a third valve that is displaceable between a fifth position where the aeration tank is disconnected from the drain and a sixth position where the aeration tank is connected to the drain, wherein the second valve, when displaced from the third position to the fourth position, displaces the third valve from the fifth position to the sixth position.

45. The aeration control apparatus of claim 44, wherein the third valve is displaceable by a gas pressure within the aeration tank, when the gas pressure is above a predetermined value, from the fifth position to the sixth position to connect the aeration tank to the drain, independently of the second valve being displaced from the third position to the fourth position, to reduce the gas pressure within the aeration tank to at most the predetermined value.

46. The aeration control apparatus of claim 43, wherein the first valve is a solenoid valve.

47. The aeration control apparatus of claim 43, wherein the source of compressed oxidizing gas is a canister of compressed oxygen-rich gas.

48. The aeration control apparatus of claim 43, wherein the source of compressed oxidizing gas is a compressor.

49. The aeration control apparatus of claim 48, wherein the compressor is mounted to the aeration control apparatus.

50. The aeration control apparatus of claim 48, wherein the compressor is operably connected to the controllable actuator, such that, when the controllable actuator is in the first state, the compressor is operated to supply compressed oxidizing gas to the first valve and, when the controllable actuator is in the second state, the compressor is not operated.

51. The aeration control apparatus of claim 43, wherein the controllable actuator is a timer, the first state is a first timing state and the second state is a second timing state.

52. The aeration control apparatus of claim 50, wherein the first timing state is less than about four percent of the second timing state.

53. The aeration control apparatus of claim 50, wherein the first timing state is maintained for a period of between about five minutes and about fifteen minutes.

54. The aeration control apparatus of claim 50, wherein the second timing state is maintained for at least approximately four hours.

55. The aeration control apparatus of claim 50, wherein the second timing state is maintained for at most approximately forty-eight hours.

56. The aeration control apparatus of claim 50, wherein the second timing state is maintained for a selectable period.

57. The aeration control apparatus of claim 7, wherein the timer has a programmable period over which the second timing state is maintained.

58. The aeration control apparatus of claim 43, wherein the second valve comprises:

a valve piston that moves from the third position to the fourth position, the valve piston having:

a first side that is exposed to the source of compressed oxidizing gas when the first valve is in the second position, and a second side that is in communication with the aeration tank via a second flow passage.

59. The aeration control apparatus of claim 58, wherein the second valve further comprises a third valve, the third valve comprising:

a valve stem having a first end engagable by the valve piston, the valve stem moved from the fifth position to the sixth position by the valve piston moving from the third position to the fourth position; and a valve seal positioned on the valve stem opposite the first end and engagable with a valve seat, the valve seal disengaging from the valve seat in response to the first end of the valve stem being engaged by the valve piston, to connect the aeration tank, via the second flow passage, to the drain.

60. The aeration control apparatus of claim 59, wherein the second valve further comprises a biasing member that biases the valve stem into engagement with the valve piston.

61. The aeration control apparatus of claim 60, wherein the valve stem has a pressure receiving surface, the valve stem moving against the biasing member when a pressure within the aeration tank that is greater than a predetermined value acts against the pressure receiving surface, such that the valve seal disengages from the valve seat to connect the aeration tank to the drain via the second flow passage, such that the pressure within the aeration tank is reduced.

62. The aeration control apparatus of claim 43, wherein the second valve comprises:

a valve piston that moves from the third position to the fourth position, the valve piston having:

a first side that is exposed to the gas source when the first valve is in the second position, and a second side that is in communication with the aeration tank via a second flow passage;

a valve stem that moves with the valve piston such that the valve stem moves from a fifth position to a sixth position when the valve piston moves from the third position to the fourth position; and a valve seal positioned on the valve stem that disengages from the valve seat in response to the valve stem moving from the fifth position to the sixth position to connect the aeration tank, via the second flow passage, to the drain.

63. The aeration control apparatus of claim 62, wherein the second valve further comprises biasing member that biases the valve stem into engagement with the valve piston.

64. The aeration control apparatus of claim 63, wherein the valve stem has a pressure receiving surface, the valve stem moving against the biasing member when a pressure within the aeration tank that is greater than a predetermined value acts against the pressure receiving surface, such that the valve seal disengages from the valve seat to connect the aeration tank to the drain via the second flow passage, such that the pressure within the aeration tank is reduced.

65. A water filtration apparatus usable to remove oxidizable contaminants from a fluid containing such oxidizable contaminants, comprising:

an aeration tank;

a drain line;

a source of compressed oxidizing gas;

a controllable valve that controllably connects the source of compressed oxidizing gas to a second valve, the second valve operable by pressure of the compressed oxidizing gas supplied by the source of compressed oxidizing gas to open a first flow passage between the source of compressed oxidizing gas and the aeration tank;

an actuator operably connected to the controllable valve to operate an actuator of the controllable valve to move the controllable valve between a first position where the compressed oxidizing gas is provide to the second valve and a second position where the compressed oxidizing gas is not provided to the second valve;

wherein the second valve comprises:
  a valve piston having a first side exposed to the source of compressed oxidizing gas when the controllable valve is in the second state, and a second side communicating with the aeration tank through a second flow passage, and
  a valve stem that moves with the valve piston, the valve stem moving with the valve piston when the valve piston moves to open the first flow passage between the source of compressed oxidizing gas and the aeration tank,
  a valve seal positioned on the valve stem and engagable with a valve seat, the valve seal disengaging from the valve seat in response to the valve stem moving with the valve piston to connect the aeration tank, via the second flow passage, to the drain.

66. The water filtration apparatus of claim 65, wherein:
the valve stem is separate from and engagable with the valve piston, the valve stem comprising a first end engageable by the valve piston to move the valve stem with the valve piston; and
the valve seal is positioned on the valve stem opposite the first end of the valve stem.

67. The water filtration apparatus of claim 66, wherein the second valve further comprises a biasing member positioned between the valve piston and the valve stem to bias the valve stem into engagement with the valve piston.

68. The water filtration apparatus of claim 67, wherein the valve stem further comprises a pressure receiving surface to cause the valve stem to move against the biasing member forming a pressure relief valve, so that excess pressure within the aeration tank will cause the valve seal to move away from the valve seat to connect the bleed-off tube to the drain when the second valve is closed and pressure in the aeration tank is sufficiently high to overcome the biasing member and unseat the valve seat from the valve seal.

69. The water filtration apparatus of claim 65, wherein the actuator is operably connected to the source of compressed oxidizing gas to turn the source of compressed oxidizing gas on and off as the first valve is placed in the first and second positions, respectively.

70. The water filtration apparatus of claim 65, wherein the actuator is programmable to place the controllable valve in the first position for a first period of time and to place the controllable valve in the second position for a second period of time, the second period of time being at least about 24 times as long as the first period of time.

71. The water filtration apparatus of claim 70, wherein the first period of time is about ten minutes, and the second period of time is adjustable between about four hours and about forty-eight hours.

72. An aeration tank control valve assembly usable with an aeration tank, comprising:
  an aeration head having a base that mounts to an opening in the aeration tank, the aeration head having a water inlet and a water outlet that communicate with the opening in the aeration tank;
  a diffuser supported at the base of the aeration head in communication with the water inlet and the aeration tank;
  a pick-up tube communicating with the aeration head water outlet and the aeration tank;
  a valve housing mounted to the aeration head, wherein portions of the valve housing and the aeration head define a flow passage that communicates with the aeration tank;
  a gas source supplying compressed oxidizing gas;
  a bleed-off tube which extends into the aeration tank and which communicates with the valve housing;
  a first valve connected to the housing;
  a second valve located within the valve housing and communicating with the first valve;
  a third valve; and
  an actuator operatively connected to at least the first valve, wherein:
    the first valve is displaceable between a first position disconnecting the second valve from the gas source and opening the flow passage to an atmospheric exhaust and a second position connecting the second valve to the gas source;
    the second valve is displaceable between a third position that closes the flow passage to disconnect the aeration tank from the first valve and a fourth position that opens the flow passage to connect the first valve and the aeration tank, gas pressure from the gas source moving the second valve from the third position to the fourth position when the first valve is in the second position;
    the third valve is displaceable between a fifth position that disconnects the bleed-off tube and the drain and a sixth position that connects the bleed-off tube and the drain, the second valve, when displaced from the third position to the fourth position, displacing the third valve from the fifth position to the sixth position;
    the actuator, when in a first state, operates the first valve to displace the first valve from the first position into the second position, and, when in a second state, does not operate the first valve, such that the first valve is in, or returns from the second position to, the first position, wherein the actuator is operable to repeatedly switch between the first state and the second state.

73. The aeration tank control valve assembly of claim 72, wherein the pick-up tube extends through the diffuser into the aeration tank.

74. The aeration tank control valve assembly of claim 72, wherein the bleed-off tube extends through the diffuser and the aeration head.

75. The aeration tank control valve assembly of claim 72, wherein the gas source is a compressor.

76. The aeration tank control valve assembly of claim 75, wherein the compressor is operably connected to the actuator, such that, when the actuator is in the first state, the compressor is operated to supply compressed oxidizing gas to the first valve and, when the timer is in the second state, the compressor is not operated.

77. The aeration tank control valve assembly of claim 72, wherein the first state is maintained for a period that is less than about four percent of a period over which the second state is maintained.

78. The aeration tank control valve assembly of claim 72, wherein the first state is maintained for a period of between about five minutes and about fifteen minutes.

79. The aeration tank control valve assembly of claim 78, wherein the second state is maintained for at least approximately four hours.

80. The aeration tank control valve assembly of claim 78, wherein the second state is maintained for at most approximately forty-eight hours.

81. The aeration tank control valve assembly of claim 72, wherein the actuator is programmable to select the period over which the second state is maintained.

82. The aeration tank control valve assembly of claim 72, wherein the second valve comprises:
  a valve piston that moves from the third position to the fourth position, the valve piston having:
    a first side that is exposed to the gas source when the first valve is in the second position, and
    a second side that is in communication with the aeration tank the interior of the air tank by way of the bleed-off tube; and
  the third valve, which comprises:
    a valve stem having a first end engagable by the valve piston, the valve stem moved from the fifth position to the sixth position by the valve piston moving from the third position to the fourth position, and
    a valve seal positioned on the valve stem opposite the first end and engagable with a valve seat, the valve seal disengaging from the valve seat in response to the first end of the valve stem being engaged by the valve piston, to open the interior of the aeration tank to the drain through the bleed-off tube; and
    a biasing member that biases the valve stem into engagement with the valve piston.

83. The aeration control apparatus of claim 82, wherein the valve stem has a pressure receiving surface, the valve stem moving against the biasing member when a pressure within the aeration tank that is greater than a predetermined value acts against the pressure receiving surface, such that the valve seal disengages from the valve seat to connect the aeration tank to the drain bleed-off tube, such that the pressure within the aeration tank is reduced.

84. A method for recharging an aeration tank with an amount of compressed, oxygen-containing gas, comprising:
  placing, during a first period of time, at least a controllable first valve into a first position to supply compressed oxygen-containing gas to a second valve;
  applying the supplied compressed oxygen-containing gas against a first portion of the second valve to move the second valve to open a first flow passage;
  moving a third valve, in response to moving the second valve, to connect the aeration tank, through a second flow passage, to a drain line;
  supplying the compressed oxygen-containing gas to the aeration tank through the first flow passage and venting at least one of used gas and aerated fluid from the aeration tank through the second flow passage to the drain line while the controllable first valve is in the first position;
  placing, during a second period of time following the first period of time, at least the controllable first valve into a second position so that the compressed oxygen-containing gas is not supplied to the second valve; and
  applying pressure of the supplied compressed oxygen-containing gas contained within the aeration tank to the second portion of the second valve to return the second valve to a position where the first flow passage is closed, such that a new supply of the compressed oxygen-containing gas is contained within the aeration tank as the amount of compressed oxygen-containing gas.

85. The method of claim 84, wherein:
  the first portion of the second valve is a valve piston; and
  applying the compressed oxygen-containing gas against the first portion of the second valve to move the second valve to open the first flow passage comprises applying the compressed oxygen-containing gas against a first side of the valve piston of the second valve to move the valve piston to open the first flow passage.

86. The method of claim 85, wherein applying pressure of the supplied compressed oxygen-containing gas contained within the aeration tank to the second valve to return the second valve to the position where the first flow passage is closed comprises:
  connecting the first side of the piston to an atmospheric vent; and
  applying pressure of the supplied compressed oxygen-containing gas contained within the aeration tank to a second side of the valve piston opposite the first side of the valve piston to return the valve piston to the position where the first flow passage is closed.

87. The method of claim 84, wherein:
  the second valve comprises a piston;
  the third valve comprises a valve stem positioned within the second valve, the valve stem having one end engagable with the piston and a valve seal at the other end, the valve seal engagable with a valve seat to disconnect the aeration tank from the drain line; and
  moving the third valve, in response to moving the second valve, to connect the aeration tank, through the second flow passage, to the drain line comprises moving the valve stern in response to moving the piston to disengage the valve seal from the valve seat to connect the aeration tank, through the second flow passage, to the drain line.

88. The method of claim 84, further comprising venting excess pressure in the aeration tank, if the aeration tank has an internal pressure that is greater than a predetermined value, by moving the third valve in response to the internal pressure being greater than the predetermined value to connect the aeration tank, through the second flow passage, to the drain line.

89. The method of claim 88, wherein:
  the second valve comprises a piston;
  the third valve comprises a valve stem positioned within the second valve, the valve stem having one end engagable with the piston, a valve seal at the other end and a pressure receiving surface, the valve seal engagable with a valve seat to disconnect the aeration tank from the drain line; and
  moving the third valve in response to the internal pressure being greater than the predetermined value to connect the aeration tank to the drain line comprises applying aeration tank pressure to the pressure receiving surface of the valve stem to move the valve stem away from the piston, such that the valve seal disengages from the valve seat to connect the aeration tank to the drain line via the second flow passage.

90. The method of claim 84, wherein placing, during the first period of time, at least the controllable first valve into the first position to supply compressed oxygen-containing gas to the second valve comprises activating an actuator of the controllable first value to move the first valve from the second position to the first position.

91. The method of claim 90, wherein placing, during the second period of time following the first period of time, at least the controllable first valve into the second position so that the compressed oxygen-containing gas is not supplied to the second valve comprises deactivating the actuator to move the first valve from the first position to the second position.

92. The method of claim 84, further comprising controllably supplying the compressed oxygen-containing gas from a controllable source of compressed oxygen-containing gas.

93. The method of claim 92, wherein controllably supplying the compressed oxygen-containing gas from a controllable source of compressed oxygen-containing gas comprises activating the controllable source of compressed oxygen-containing gas during the first period of time so that the compressed oxygen-containing gas is supplied to the first valve during the first period.

94. The method of claim 84, wherein controllably supplying the compressed oxygen-containing gas from a controllable source of compressed oxygen-containing gas comprises deactivating the controllable source of compressed oxygen-containing gas during the second period of time so that the compressed oxygen-containing gas is not supplied to the first valve during the second period.

95. A method for removing oxidizable contaminants from a supply of fluid containing such oxidizable contaminants, comprising:

charging the aeration tank with the amount of compressed, oxygen-containing gas using the method of claim 84;

supplying fluid containing oxidizable contaminants into the aeration tank such that the supplied fluid passes through the new supply of compressed oxygen-containing gas within the aeration tank to oxidize at least a portion of the oxidizable contaminants contained in the supply of fluid; and providing the supplied fluid from the aeration tank to a filter to remove the oxidized oxidizable contaminants from the supply of fluid.

\* \* \* \* \*

UNITED STATES PATENT AND TRADEMARK OFFICE
CERTIFICATE OF CORRECTION

PATENT NO.         : 7,156,995 B2                                           Page 1 of 1
APPLICATION NO.    : 10/091170
DATED              : January 2, 2007
INVENTOR(S)        : Maas et al.

It is certified that error appears in the above-identified patent and that said Letters Patent is hereby corrected as shown below:

In column 4, line 30 of the issued patent, "shuffle valve" should be -- shuttle valve --

In column 11, line 47 of the issued patent, "of claim 50" should be -- of claim 51 --

In column 11, line 50 of the issued patent, "of claim 50" should be -- of claim 51 --

In column 11, line 53 of the issued patent, "of claim 50" should be -- of claim 51 --

In column 11, line 56 of the issued patent, "of claim 50" should be -- of claim 51 --

In column 11, line 59 of the issued patent, "of claim 50" should be -- of claim 51 --

In column 11, line 61 of the issued patent, "of claim 7" should be -- of claim 51 --

In column 13, line 38 of the issued patent, "valve stern" should be -- valve stem --

In column 16, line 34 of the issued patent, "valve stem" should be -- valve stem --

In column 17, line 17 of the issued patent, "of claim 84" should be -- of claim 90 --

Signed and Sealed this

Tenth Day of November, 2009

David J. Kappos
*Director of the United States Patent and Trademark Office*